(No Model.)

A. O. SHIELDS.
REGISTER FOR ODOMETERS.

No. 525,630. Patented Sept. 4, 1894.

Witnesses:

Inventor
Augustin O. Shields
by S. C. Fitzgerald
Att'y.

UNITED STATES PATENT OFFICE.

AUGUSTUS O. SHIELDS, OF KINGSTON, TEXAS.

REGISTER FOR ODOMETERS.

SPECIFICATION forming part of Letters Patent No. 525,630, dated September 4, 1894.

Application filed April 12, 1894. Serial No. 507,257. (No model.)

*To all whom it may concern:*

Be it known that I, AUGUSTUS O. SHIELDS, a citizen of the United States, residing at Kingston, in the county of Hunt and State of Texas, have invented certain new and useful Improvements in Distance-Measuring Instruments; and I do hereby declare the following to be a full, clear, and exact description of the invention, such as will enable others skilled in the art to which it appertains to make and use the same.

My invention relates to improvements in distance measuring instruments.

My invention is particularly intended for application to harvesting machines, whereby the distance traveled by the harvester may be recorded, thus serving as a basis for determining the amount to be charged for cutting grain.

The invention consists in such features, details of construction and combination of parts as will first be described in connection with the accompanying drawings and then particularly pointed out in the claims.

Figure 1:
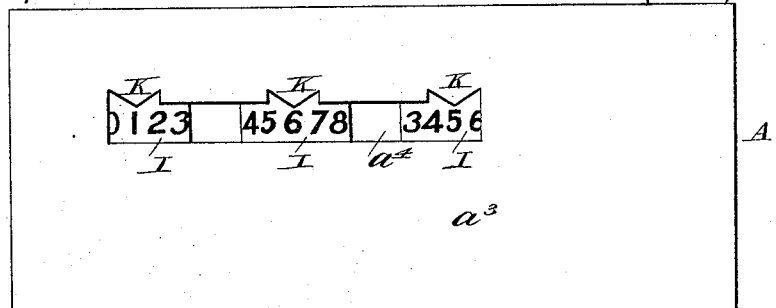
Figure 2:
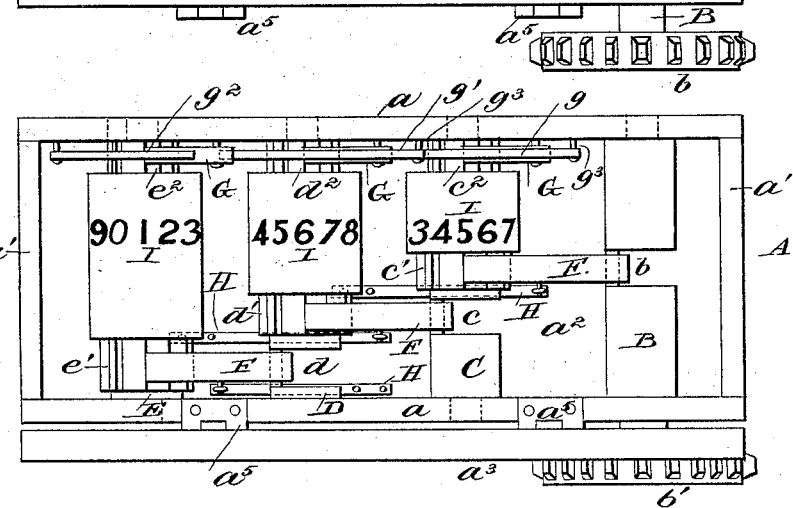
Figure 3:
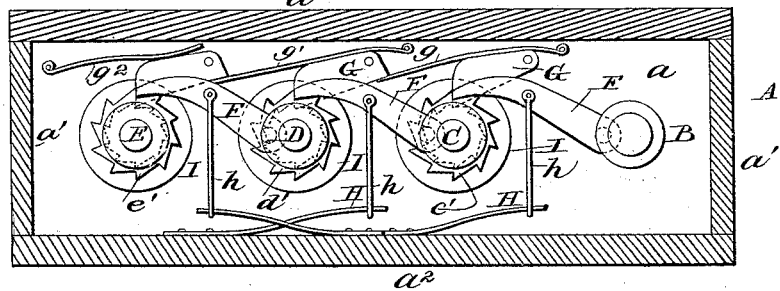
Figure 4:
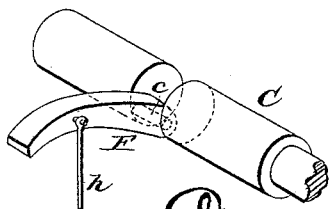

In the drawings—Figure 1 is a plan view of a measuring device embodying my invention. Fig. 2 is a similar view with the lid of the casing removed. Fig. 3 is a side elevation of the same with the rear side of the casing removed. Fig. 4 is a detail view of one of the cranks and pawls.

Referring to the drawings, A is a casing, consisting of sides, $a$, ends, $a'$, bottom, $a^2$, and a lid, $a^3$, which is provided with a glazed opening, $a^4$, and is hinged to the sides $a$ at $a^5$.

Within the casing are journaled four shafts B, C, D, E, three of which are provided with cranked portions, as shown at $b$, $c$, $d$. The first shaft B, projects through the casing at one side and is provided with a sprocket wheel $b'$ adapted to be engaged by a sprocket chain on the harvester, whereby the distance measuring mechanism is operated.

On each of the shafts C, D and E are fixed two ratchet wheels, one of which, $c'$, $d'$, $e'$ is engaged by a connecting rod pawl F, these pawls being driven by the cranked portions $b$ $c$ and $d$ previously referred to. The other ratchet wheels $c^2$, $d^2$ $e^2$ are in the nature of brake wheels and are normally engaged by pawls G held in contact with the said ratchet wheels by springs $g$, $g'$, $g^2$. Two of these springs are secured to studs, $g^3$ and pass over the top of their respective pawls and engage the under side of one end of the next pawl, thus acting not only to hold their own pawls down but also assisting in retaining the next pawl in its position of engagement with the ratchet wheel.

In order to hold the connecting-rod pawls F into contact with their respective ratchet wheels, a series of leaf springs H is provided, each being secured at one end to the bottom of the casing and provided at their other end with a link $h$ pivotally attached to the spring and to the connecting-rod pawl.

On each of the shafts C, D and E are fixed the dial wheels I each provided with a series of figures from 0 to 9.

The operation of my device is as follows: The sprocket wheel $b'$ is driven by the harvester driving chains, and is of such dimensions that for every forward movement of the master wheel of one rod, one yard or such similar unit, the shaft B will make one revolution. This one revolution is registered on the dial wheel I, fixed to the shaft C, by the action of the connecting-rod pawl F which is attached to the shaft B and actuates the ratchet wheel $c'$. When the shaft C is rotated one entire revolution, its connecting-rod pawl F moves the shaft D and its dial wheel I in a similar manner. One revolution of the shaft D moves the shaft E and its dial wheel in the same manner. Thus it will be seen that the dials indicate the units, tens, and hundreds of revolutions of the shaft B, and, as said shaft B makes one revolution for each yard, rod, or similar unit traveled by the master-wheel, the said dials of course indicate the units, tens or hundreds of such unitary distance. The dial wheels are visible through the glazed opening, $a^4$, and may be read in connection with indices K projecting from the side of the casing above the dial wheels.

Having thus fully described my invention, what I claim as new, and desire to secure by Letters Patent, is—

1. In a distance measuring device, the combination, with a casing, a series of dial shafts in the casing having cranked portions, and a series of ratchet wheels fixed on said shafts, of a shaft having a cranked portion only and a shaft having a ratchet wheel only, a series of connecting-rod pawls attached to the cranked portions of the shafts, each pawl engaging the ratchet wheel of the next shaft, a series of brakes on the dial shafts, leaf springs arranged beneath the connecting rod pawls and links connected at their lower ends to the leaf springs and at their upper ends to the pawls, substantially as and for the purpose described.

2. In a measuring device, the combination, with a series of dial shafts, a series of ratchet wheels fixed on the shafts and a series of pawls engaging the ratchet wheels, of a casing in which the shafts are journaled, a series of studs fixed in the casing, and a series of leaf springs passing from each stud over the top of one pawl and bearing beneath the end of the next adjoining pawl, substantially as and for the purpose set forth.

In testimony whereof I affix my signature in presence of two witnesses.

AUGUSTUS O. SHIELDS.

Witnesses:
L. I. GRUSS,
FRANK. SHIELDS.